United States Patent
Babich

(10) Patent No.: US 10,234,257 B2
(45) Date of Patent: Mar. 19, 2019

(54) DEVICE FOR USE WITH A REFERENCE TOOL

(71) Applicant: Achieve Manufacturing Inc., Leduc (CA)

(72) Inventor: Paul Babich, Leduc (CA)

(73) Assignee: Achieve Manufacturing Inc. (CA)

(*) Notice: Subject to any disclaimer, the term of this patent is extended or adjusted under 35 U.S.C. 154(b) by 97 days.

(21) Appl. No.: 15/005,887

(22) Filed: Jan. 25, 2016

(65) Prior Publication Data

US 2017/0211919 A1   Jul. 27, 2017

(51) Int. Cl.
| G01B 3/56 | (2006.01) |
| B43L 7/00 | (2006.01) |
| G01B 21/04 | (2006.01) |

(52) U.S. Cl.
CPC ............ *G01B 3/566* (2013.01); *B43L 7/00* (2013.01); *G01B 3/563* (2013.01); *G01B 21/047* (2013.01)

(58) Field of Classification Search
CPC ... G01C 9/28; G01C 9/18; G01C 9/34; G01C 15/004; G01C 15/10; G01C 9/26; B43L 7/007; B43L 12/02; B43L 7/00; B43L 7/005; B43L 13/002; B43L 13/02
USPC .............. 33/484, 489, 529, DIG. 1
See application file for complete search history.

(56) References Cited

U.S. PATENT DOCUMENTS

| 4,380,872 | A | * | 4/1983 | Moran | G01B 3/00 33/427 |
| 5,481,813 | A | * | 1/1996 | Templeton | G01B 3/1071 33/758 |
| 6,173,502 | B1 | * | 1/2001 | Scarborough | G01C 9/28 33/371 |
| 6,532,675 | B2 | * | 3/2003 | Letourneau | G01C 9/12 33/277 |
| 6,622,395 | B1 | * | 9/2003 | Hickey | B25H 7/005 33/452 |
| 6,904,689 | B2 | * | 6/2005 | Sugita | B27F 1/00 33/427 |
| 6,996,911 | B1 | * | 2/2006 | Dinius | G01B 3/566 33/371 |
| 7,059,225 | B1 | * | 6/2006 | Rabell | B23Q 9/0042 83/13 |
| 7,178,252 | B1 | * | 2/2007 | Belgard | B23K 37/0533 33/412 |
| 7,305,773 | B2 | * | 12/2007 | Hios | B43L 7/10 33/429 |

(Continued)

*Primary Examiner* — Yaritza Guadalupe
(74) *Attorney, Agent, or Firm* — Scott T. Griggs; Griggs Bergen LLP

(57) ABSTRACT

A device is provided for use with a reference tool during the construction of metal structures. The device comprises a body having a groove formed therein for receiving a portion of a straight side of the reference tool. The body further comprises a base surface for co-operating with the surface of a metal workpiece. The base surface is configured whereby, when a portion of the straight side is received within the groove, the base surface is parallel to the straight side of the reference tool. A retention assembly is mounted on the body for retaining the portion of the straight side of the reference tool, when provided, within the groove. At least one magnet is mounted on the base surface for temporarily holding the device to the metal workpiece, thereby holding the reference tool in position.

19 Claims, 7 Drawing Sheets

(56) References Cited

U.S. PATENT DOCUMENTS

| | | | |
|---|---|---|---|
| 7,343,688 B2 * | 3/2008 | Price | B25H 7/00 33/418 |
| 2002/0178597 A1 * | 12/2002 | Todd | G01B 11/26 33/286 |
| 2017/0211919 A1 * | 7/2017 | Babich | G01B 3/563 |

* cited by examiner

DEVICE FOR USE WITH A REFERENCE TOOL

TECHNICAL FIELD OF INVENTION

The present disclosure relates to devices for use with reference tools during the construction of metal structures. These devices can find particular application in the measurement and alignment of pipes and fittings during the construction of piping systems and pipelines.

BACKGROUND TO THE INVENTION

Trades workers are known to use reference tools to either make a measurement or properly align workpieces. Examples of reference tools can include, among other things, carpenter's squares, protractors, straight edges, and levels.

However, often trades workers may find themselves working in less than ideal conditions. For example, a metal worker, working out in the field, can work in isolation and have access only to a limited number of tools.

Certain problems can commonly arise for metal trades workers with respect to reference tools. For example, when using a reference tool to align two workpieces, a worker may discover that they are in need of an extra set of hands to hold the reference tool in an appropriate position while measuring, aligning, and/or working on the workpieces. However, employers and clients demand efficient use of manpower and will not pay for an extra person simply to hold reference tools. Therefore, the nature of the work dictates that a person will often find that they are required to accomplish or perform multiple tasks at once.

One situation that may be particularly challenging is when a metal worker is attempting to join two workpieces together at a specific angle to each other. The worker is required to hold a reference tool (e.g., a protractor), align the pieces at the desired angle using the reference tool, and tack the pieces together in preparation for the joint to be welded. A clamp may be used to hold the pieces of pipe at the angle, but clamps can block access to the joint for tacking.

A worker may also discover that there are obstacles and impediments present on the surfaces of the workpiece that prevent the accurate use of a reference tool. For example, welds, flanges, bolts, and fittings found on piping can make it difficult to use a reference tool to measure and/or align sections of pipe.

Further, a worker may discover that he or she may not have a reference tool long enough for the job. Large reference tools can be clumsy and awkward to carry to certain jobsites. Additionally, large reference tools can be fragile and may get damaged in the field. Therefore, large tools might not be carried by workers and available when they are required.

Accordingly, there is a need in many metal-working industries for a device for use with reference tools which addresses the limitations of the current methods and apparatuses of measuring and aligning metal workpieces during the construction of metal structures.

SUMMARY OF THE INVENTION

A device for use with a reference tool is provided. The device can be disengagably secured to the reference tool and can be used in the measurement and/or alignment of metal workpieces during the construction of metal structures.

In this document, the term "reference tool" can refer to any tool that can be used to take a measurement or align workpieces. Non-limiting types of reference tools can include carpenter's squares, drywall squares, carpenter's protractors, straight edges, and levels. It will be understood that the present disclosure is not limited by the type of reference tool that can be used with the device provided.

In this document, the term "length" and "width" can be defined in reference to surface of a workpiece (which may be planar or curved). The term "length" can refer to the directions generally parallel to the surface of a workpiece. The term "width" can refer to the directions that are generally perpendicular to the surface.

Broadly stated, in some embodiments, the device for use with a reference tool having a straight side. The device comprises:

a body having a width, a length, and a groove formed in the body along the length, the groove dimensioned to receive at least a portion of the straight side, the body also having a base surface for engaging a metal workpiece surface, and the base surface further being configured so that when the at least a portion of the straight side is received within the groove the base surface is parallel to the straight side;

a retention assembly mounted to the body, the retention assembly for co-operating with the reference tool, when provided, and disengagably securing the body to the reference tool and retain the at least a portion of the straight side within the slot; and at least one magnet mounted to the base surface of the body for temporarily securing the base surface to the workpiece surface.

Broadly stated, in some embodiments, the device can be characterized by the following attributes:

a magnetic force, produced by magnets, can be used to hold a reference tool next to a metal workpiece surface at a position where a measurement and/or alignment with the reference tool can be made. This measurement/alignment can be made without a user having to hold the reference tool in the appropriate position. In other words, the user's hands can be free to perform another work actively while the device maintains the position of the reference tool;

a body of the device can elevate the reference tool away from the surface of the workpiece while maintaining a parallelism between the plane of the base surface and a straight side of the reference tool. Further, the footprint of the body of the device on the workpiece can be configured to be less than the footprint of the reference tool. As a result, there can be a space provided between the reference tool and the workpiece. This space can be used to accommodate a variety of obstacles such as flanges, pipe fittings, bolts, welds, cables, small diameter all-thread rods, or lines; and the body of the device can provide a reliable point of attachment for a second reference tool, connecting the first reference tool to the second. The second reference tool can then be used to extend the range of alignment or measurement that can be made using the first reference tool.

Broadly stated, in some embodiments, the body can be in the general shape of a rectangular block. The body can also be in the general shape of a cube, in some embodiments.

Broadly stated, in some embodiments, a retention assembly for the device can comprise one or more adjustable fastening means, such as threaded thumbscrews that correspond to threaded apertures in the body. When the thumbscrews are inserted into the threaded apertures, the screws can extend into a retention groove in the body. When provided in the apertures and tightened, the thumbscrews can urge a reference tool, which is inserted into the retention groove, against the wall of the groove to hold the reference tool tightly in place.

Broadly stated, in some embodiments, the base surface of the body can be flat. However, it can be useful in some embodiments that the bottom surface form a u-shaped or a v-shaped groove, which can help maintain base surface engagement with a surface, for example, such as the centre of a section of pipe.

Broadly stated, in some embodiments, a kit is also provided comprising a plurality of devices for use with a reference tool. The kits can further comprise devices having different lengths and/or widths. A plurality of devices and devices of different dimensions can increase the number of situations that a user can receive benefit from the use of the device.

Broadly stated, in some embodiments, a method of holding a reference tool in a position adjacent to a metal workpiece and a method of extending the distance of measurement of a reference tool having a straight side are provided.

BRIEF DESCRIPTION OF THE DRAWINGS

Embodiments of the present disclosure are further described, by way of example, with reference to the accompanying figures, in which.

DETAILED DESCRIPTION OF THE INVENTION

Figure 1:
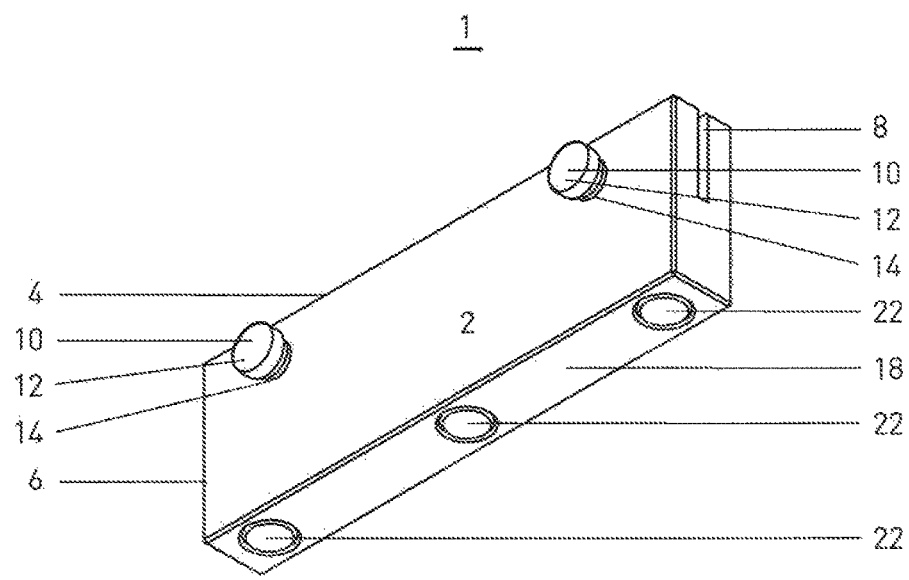
FIG. 1 is a perspective view of an embodiment of a device for use with a reference tool.

A device 1 is provided in the present disclosure for use with a reference tool during the construction of metal structures. Having reference to FIG. 1, which shows a non-limiting embodiment, device 1 can comprise a body 2 having a length 4 and a width 6. As shown, width 6 can be shorter than length 4, although it would be understood that the reverse could also be true in some embodiments. Body 2 can be formed in the shape of a rectangular block. It may be useful in some embodiments that length 4 of body 2 be less than the length of the reference tool it is used with.

In some embodiments, a groove 8 can be formed in the body 2. Groove 8 can be dimensioned and/or configured to receive a portion of a straight side of a reference tool within groove 8. Groove 8 can also be formed along length 4 of body 2.

In some embodiments, a retention assembly 10 can be used to disengagably secure body 2 to the reference tool and retain the portion of the reference tool straight side within groove 8. A person skilled in the art would realize that there are a number of known disengagable retention means that could be used as retention assembly 10 to retain the portion of straight side within groove 8 and secure device 1 to the reference tool, the substitution thereof being within the scope of the present disclosure.

In some embodiments, retention assembly 10 can comprise one or more threaded thumbscrews 12 that can be positioned in corresponding threaded apertures 14 formed in body 2. The embodiment depicted in FIGS. 1 to 3 includes two thumbscrews 12, although it would be appreciated that any number could be used without departing from the scope of the disclosure. As can be seen in FIG. 2b, thumbscrews 12 can be threaded into threaded apertures 14 and extend into the interior of groove 8. In this position, thumbscrews 12 can be tightened and used to urge a reference tool, which is received within groove 8, against a wall 16 of groove 8 to hold device 1 to the reference tool and retain the straight side within groove 8. Thumbscrews 12 can also be loosened, when desired, to release device 1 from the reference tool.

Figure 2B:
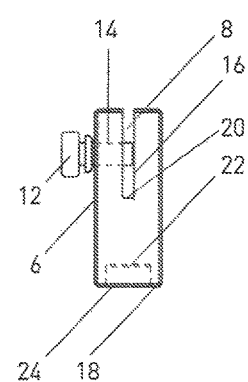
FIG. 2b is a side elevation view of the embodiment depicted in FIG. 1, where dashed lines are used to indicate internal components generally not visible in the present view.
Figure 3:
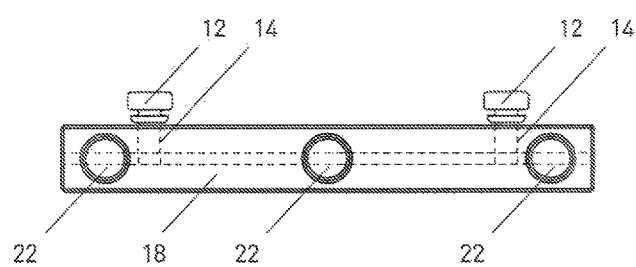
FIG. 3 is a bottom plan view of the embodiment depicted in FIG. 1, where dashed lines are used to indicate internal components generally not visible in the present view.

Referring now to FIG. 3, a base surface 18 can be included on the body 2. Base surface 18 can be configured so that it is capable of co-operating with the surface of a workpiece. The surface of the workpiece can be flat or, in the case of a section of pipe, curved. Therefore, base surface 18 can be flat, as shown in the embodiment of FIG. 2b. However, in some embodiments, base surface 18 can form a v-shaped or a u-shaped groove to co-operate with a curved workpiece surface. For example, but without limitation, a v-shaped or u-shaped channel can help facilitate base surface 18 engagement with the centre of a cylindrical object, such as a section of pipe.

In some embodiments, base surface 18 of device 1 can be approximately parallel to the straight side of the reference tool when the portion of the straight side is received within groove 8. Referring back to the embodiment depicted in FIG. 2a, a bottom 20 of groove 8 can be parallel to base surface 18. Using this configuration, when a portion of the straight side of the reference tool is fully received within groove 8, the straight side can engage and be aligned by bottom 20 and, therefore, base surface 18 will be parallel to the straight side as base surface 18 can be configured to be parallel to bottom 20.

In some embodiments, one or more permanent magnets 22 can be mounted on or integral to base surface 18. In the embodiment shown in FIG. 3, and as a non-limiting example, three permanent magnets 22 can be used. In some embodiments, magnets 22 can be substantially disc-shaped. However, magnets 22 can also be substantially in the shape of a rectangular bar. It will be understood that the present disclosure is not limited by the shape of magnets 22 mounted onto body 2 and any shape of magnets, either mounted on or integral to base surface 18, can be used without departing from the scope of the present disclosure.

Figure 2A:
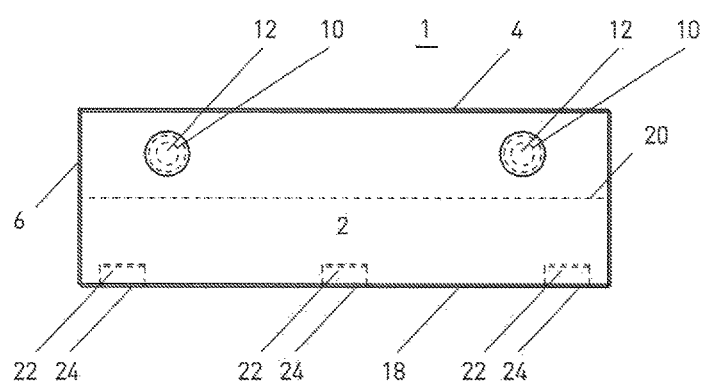
FIG. 2a is a front elevation view of the embodiment depicted in FIG. 1, where dashed lines are used to indicate internal components generally not visible in the present view.

Further, as shown in FIG. 2a, magnets 22 can be recessed within the body 2 so that a surface 24 of magnets 22 can sit flush with base surface 18. Recessing magnets 22 can be useful in forming a smooth base surface 18 to facilitate co-operation with the surface of the workpiece. In the case of a v-shaped base surface 18, pairs of opposed magnets 22 can be recessed into the sides of the v-shaped groove may be used. In this case, one magnet 22 of the pair can be positioned on one side of the v-shaped groove and the other magnet 22 can be positioned opposite to the first magnet on the other side of the groove. The magnetic force of each of the pairs of magnets 22 can be equal and opposite to each other and the pair can help stabilize the device on a curved workpiece surface, such as a pipe.

In some embodiments, magnets 22 can be used to temporarily secure base surface 18 to the workpiece surface made of a magnetic material, for example, a ferromagnetic material. Therefore, device 1 can be used as a means to temporarily hold a reference tool, secured to device 1, in an appropriate position on a metal workpiece. Such secured positioning can leave the user free to perform other tasks on the workpieces while the reference tool is held in place on the workpiece by device 1.

In some embodiments, a level indicator can be mounted onto body 2. The level indicator can determine the alignment of the body 2 with respect to the horizon, which can be used as a reference point for levelling a workpiece. The level indicator can be mounted to body by any suitable means of mounting or securement.

In some embodiments, the level indicator can include an adjustable dial bubble level can be mounted onto body 2 so that measurement and/or alignment of a workpiece with respect to horizon can be made with device 1. The dial level can be rotatable with respect to body 2 and can be secured to body 2 by any suitable means of mounting or securement that allows rotation of the dial level.

In some embodiments, a laser can be mounted on the body 2 so that the laser projects a visible beam representing a parallel or perpendicular reference point to body 2. The visible beam also being projected a distance from the body 2. The laser can be secured to body 2 by any suitable means of mounting or securement.

Figure 4A:
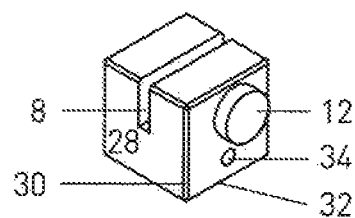
FIG. 4a is a left upper perspective view of another embodiment of a device for use with a reference tool.
Figure 4B:
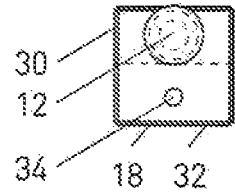
FIG. 4b is a front elevation view of the embodiment depicted in FIG. 4a, where dashed lines are used to indicate internal components generally not visible in the present view.
Figure 4C:
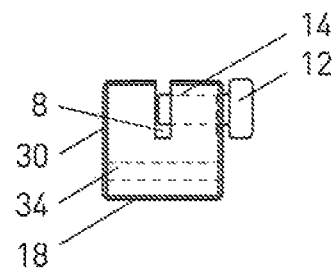
FIG. 4c is a side elevation view of the embodiment depicted in FIG. 4a, where dashed lines are used to indicate internal components generally not visible in the present view.
Figure 5A:
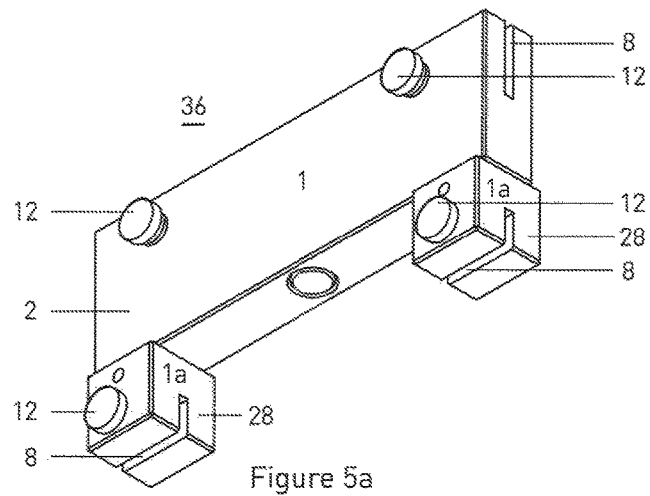
FIG. 5a is a perspective view of an embodiment of a kit comprising a plurality of devices for use with a reference tool.
Figure 5B:
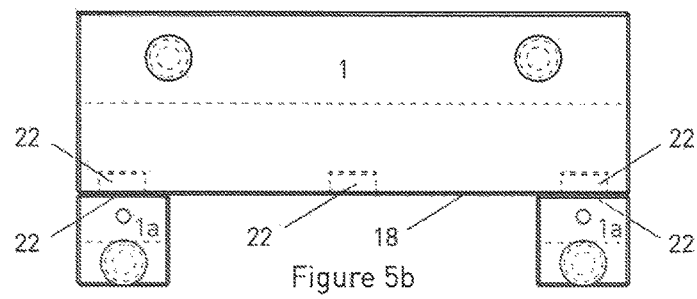
FIG. 5b is a front elevation view of the embodiment depicted in FIG. 5a, where dashed lines are used to indicate internal components generally not visible in the present view.
Figure 5C:
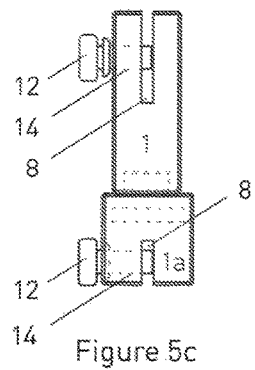
FIG. 5c is a side elevation view of the embodiment depicted in FIG. 5a, where dashed lines are used to indicate internal components generally not visible in the present view.
Figure 5D:
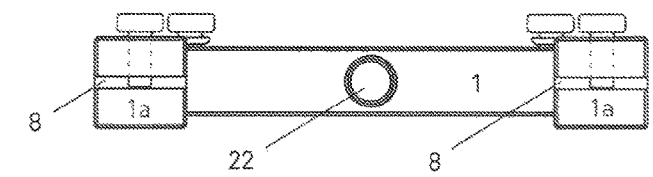
FIG. 5d is a bottom plan view of the embodiment depicted in FIG. 5a, where dashed lines are used to indicate internal components generally not visible in the present view.

Another embodiment of device 1a is shown in FIGS. 4a, 4b, and 4c. In some embodiments, device 1a can comprise a body 28 having width 30 and length 32 that are substantially equal to each other. Further, body 28 can be formed in the shape of a cube in some embodiments. In addition, device 1a can further comprise a channel 34 formed through body 28. Channel 34 can be useful in facilitating the secure attachment of base surface 18 of the device 1a to a workpiece or a second reference tool. As a non-limiting example, in some embodiments, channel 34 can be configured to receive a wire or a string and, in some cases, be dimensioned to be %₄th inches in diameter. A length of wire or string can be threaded through channel 34 and then tied tightly around a workpiece or a second reference tool, which can be temporarily held in place only by the force of magnets 22. This can ensure that body 28 is securely attached to the workpiece or second reference tool, beyond the force exerted by the magnets 22. In some embodiments, other means of attaching of base surface 18 to a second reference tool or workpiece can be used, such as clamping body 28 of device 1a to either the workpiece or second reference tool.

In some embodiments, there can also be an attachment means that can hold the plurality of devices 1 and 1a of the kit together. The attachment means can be of particular application when the devices of the present disclosure are not in use positioned on a reference tool. Attaching the devices together can allow for compact and organized storage of the kit of the devices. As shown in FIGS. 4a, 4b, and 4c, the plurality of devices can be attached together using the magnetic force of magnets 22. However, it will be understood that any number of attachment means may be used to hold the devices 1 and 1a together and that the substitution of the attachment means can still be within the scope of the present disclosure.

A kit is also provided in the present disclosure comprising a plurality of devices for use with a reference tool during the construction of metal structures. As a non-limiting example, a kit 36 shown in FIG. 5 can have three devices: a device 1 with a rectangular shaped body 2 and two devices 1a with cubed shaped bodies 28. The kits described in the present disclosure can allow for the adaptability and extension of conventional reference tools, which permit these tools to be conveniently used in a variety of different construction situations in which they had not proved convenient previously.

Figure 6:
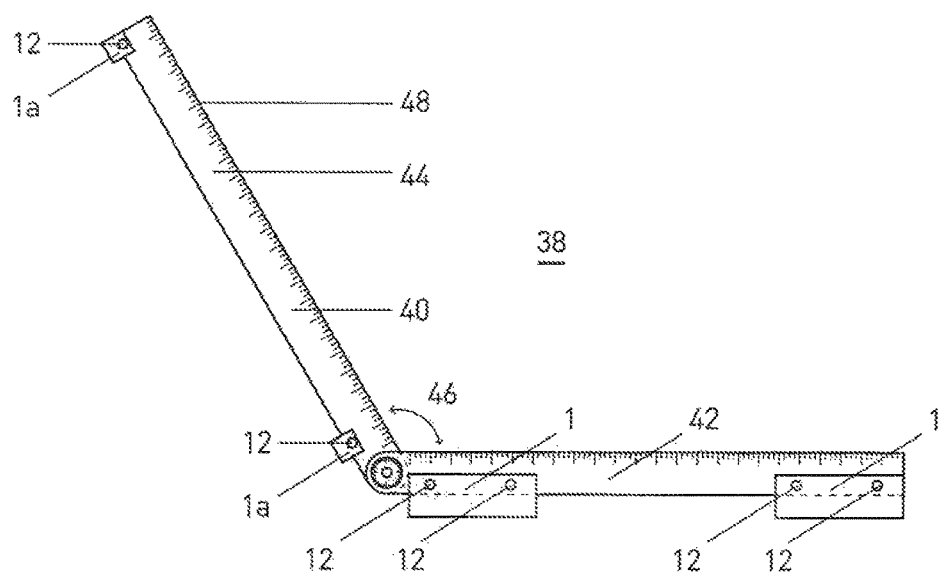
FIG. 6 depicts an embodiment of a device in use with an embodiment of a reference tool positioned on a carpenter's protractor, where dashed lines are used to indicate internal components generally not visible in the present view.

A kit of a plurality of devices can find particular application in holding a reference tool in position on a workpiece. This can free up the user to perform other work tasks on the workpiece without having to hold the reference tool. As a non-limiting example, an embodiment of a kit of devices 38 is shown in FIG. 6 positioned on a carpenter's protractor 40. Two devices 1 can be positioned on a first arm 42 of protractor 40 and two devices 1a can be positioned on a second arm 44. In the case of both arms 42 and 44, a portion of a straight side of an arm can be received within grooves 8 of each of the devices 1 and 1a and secured using thumbscrews 12, as described previously.

Once the devices 1 and 1a are in position as shown in FIG. 6, two sections of pipe can be aligned at a desired angle 46 set on protractor 40. A first section of pipe can be temporarily attached to devices 1 on the first arm 42 and the orientation of a second section of pipe can be adjusted until it comes into contact with devices 1a on the second arm 44. The magnetic forces exerted by devices 1 and 1a can keep the protractor in place temporarily without the user having to hold it. The user can then be free to tack the joint formed by the two sections of pipe without having to hold the protractor. Further, it can be possible, if the magnetic force exerted by magnets 22 on the sections of pipe is of sufficient strength, for devices 1 and 1*a* to hold the pipes in position with the magnetic force of magnets 22 while the tacking procedure is taking place.

In some embodiments, the kits of the present disclosure can be useful in extending the reach of reference tools. As a non-limiting example, kit 38 shown positioned on the protractor 40 in FIG. 6 can also find application in extending the distance that angle 46 can be measured. Conventionally, the distance that angle 46 could be measured was limited to a length 48 of the arms 42 and 44. For example, if the protractor 40 had arms 42 and 44 that are 24 inches in length, the distance that angle 46 could be measured by protractor 40 was 24 inches. To extend the reach of protractor 40, a reference tool that is longer than arms 42 and 44 can be used, such as an I-beam straight level tool. For example, a 48 inch I-beam level is often an available tool to a metal tradesperson and can be used. Also, a 72 inch or a 96 inch level can be used.

As a non-limiting example, a 48 inch level can be positioned next to devices 1*a* on second arm 44 so that it contacts both devices 1*a* and extends away from protractor 40 at angle 46. The magnetic attraction to devices 1*a* can attach to the level (which can be magnetic) and can align it with second arm 44. In this configuration, the distance that angle 46 can be measured can be extended to the length of the level. As mentioned previously, the attachment of the level to devices 1*a* can be enhanced beyond the force of magnets 22 by threading a wire or string through channel 34 on body 28 and tying the wire around the level.

However, it will be understood that the particular reference tool used as the second reference tool and the length of the second reference tool may be varied, depending upon the particular needs and desires of the user. It should be noted that devices 1*a* can be used to connect and extend the measuring and/or alignment distances of a variety of reference tools. This can be done using a variety of second reference tools that are typically available and can be used. Further, the first and second reference tools can be collapsed and stored after the measurement and/or alignment has been made.

Figure 7:
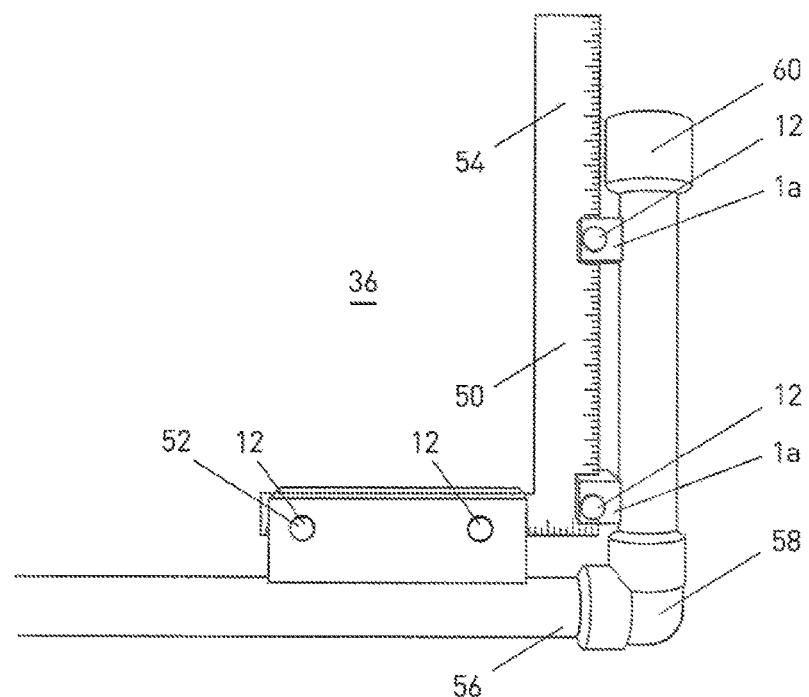
FIG. 7 depicts an embodiment of a device in use with an embodiment of a reference tool positioned on a carpenter's square in use on a section of piping.

FIG. 7 shows another situation in which kits of the present disclosure can be used. FIG. 7 depicts kit 36 of devices 1 and 1*a* positioned on a carpenter's square 50. A portion of a straight side of carpenter square 50 can be received within grooves 8 of each of devices 1 and 1*a* and can be retained in place by tightening thumbscrews 12, as described previously. A device 1 can be positioned on a shorter arm 52 of square 50 and two devices 1*a* can be positioned on longer arm 54. Kit 36 can then be used to hold square 50 in position on a section of piping 56. As shown, devices 1 and 1*a* can enable the square to be used to make the perpendicular alignment despite the presence of fittings 58 and 60.

Accordingly, it will be appreciated that the kits of the present disclosure can describe an adaptable and versatile magnetic holding system. Kits comprising devices of different lengths can be combined with different reference tools to hold the reference tools in a variety of situations where the reference tools alone may not be useful in taking a measurement or aligning workpieces. Devices can also be combined in a series along the straight edge of longer reference tools and positioned, if required, so as to avoid obstacles.

In some embodiments, the devices of the present disclosure can find particular application in situations where there are obstacles on the surface of the workpiece that can prevent the reference tool from being used accurately. The devices can allow for the straight side of the reference tool to be elevated off the surface of the workpiece that can contain obstacles to the positioning of the reference tool. In addition, the devices can have a length that is less than the length of the reference tool, which can allow for a space for obstacles between the reference tool and the workpiece. Obstacles can include, among other things, welds, bolts, small diameter all-thread rods, tubes or lines. The device can allow for the reference tool to be used to measure over and/or around the obstacle.

Figure 8:
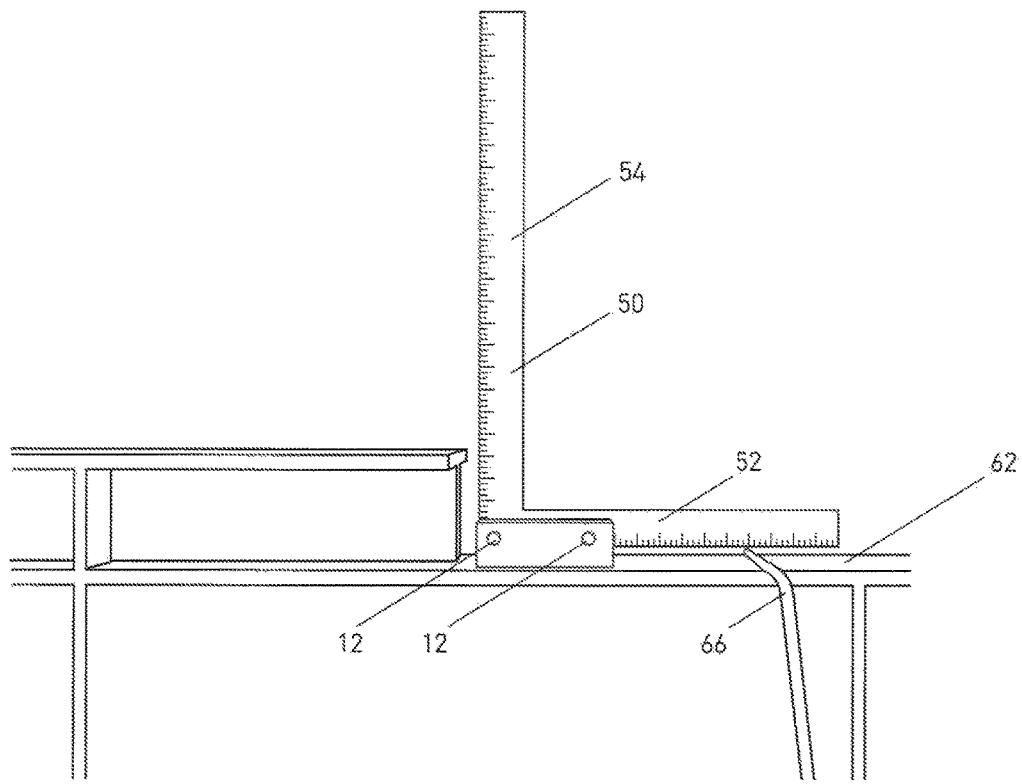
FIG. 8 depicts an embodiment of a device in use with an embodiment of a reference tool positioned on a carpenter's square in use on a metal structure.

Having reference to FIG. 8, by way of non-limiting example, device 1 can enable short arm 52 of carpenter's square 50 to be elevated above a surface 62 of a workpiece while the square 50 is being used. As depicted, the device 1 can allow the immovable metal line 66 to run underneath square 50 in the space between square 50 and surface 62.

Figure 9:
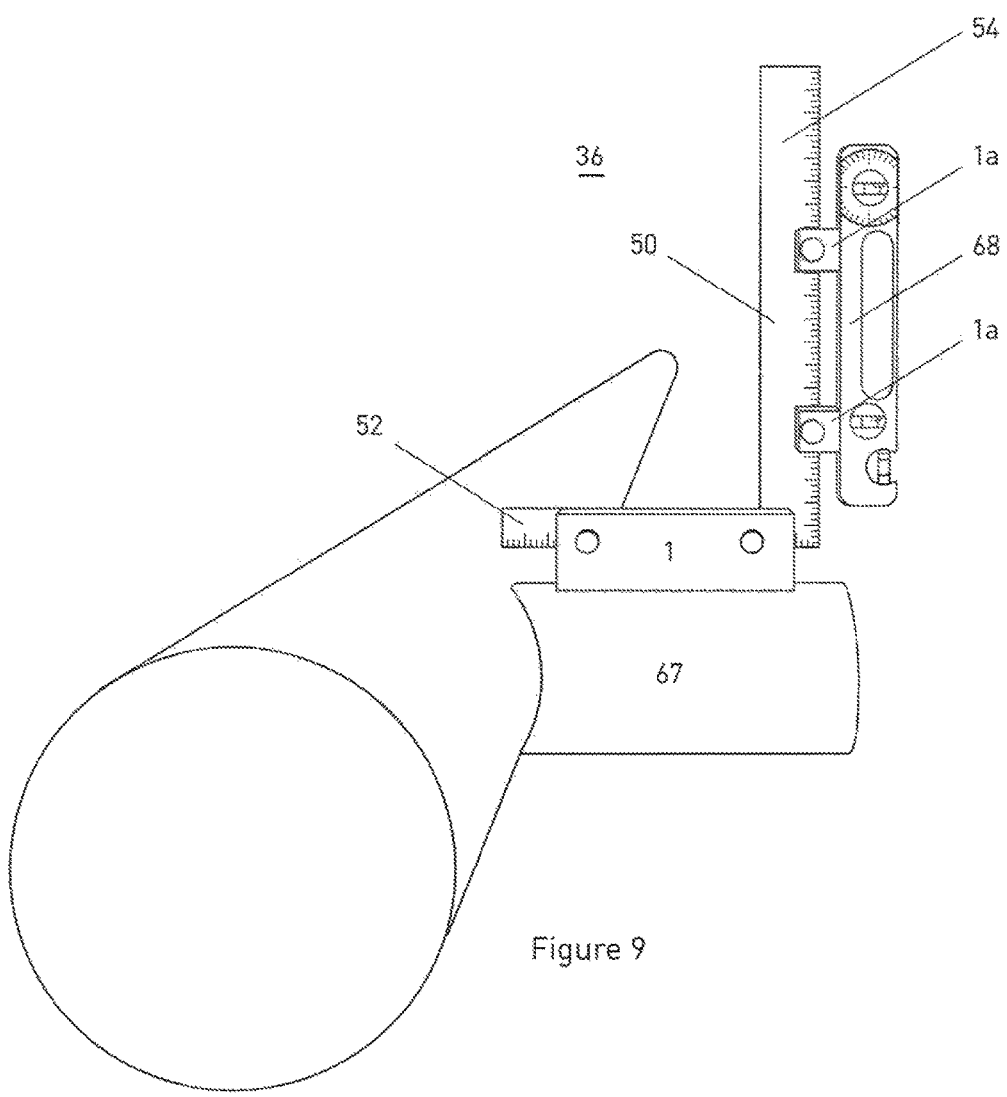
FIG. 9 depicts an embodiment of a device in use with an embodiment of a reference tool positioned on a carpenter's square and in use on a section of piping.

In some embodiments, the kits of the present disclosure can be used by a user to measure the alignment of a workpiece with respect to the horizon. As depicted in FIG. 9, kit 36 of devices for use with a reference tool can be used with carpenter's square 50 and level 68. Device 1 can be attached to short arm 52 of square 50 and can be used to orient and hold square 50 on pipe 67. In this depicted position, the longer arm 54 can be perpendicular to pipe 67. Two devices 1*a* can also be attached to longer arm 54 and level 68 held in position next to long arm 54. In this arrangement, a reading of orientation with respect to horizon can be made without the user having to hold square 50 and level 68.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

While the above description details certain embodiments of the invention and describes certain embodiments, no matter how detailed the above appears in text, the invention can be practiced in many ways. Details of the devices and methods may vary considerably in their implementation details, while still being encompassed by the invention disclosed herein. These and other changes can be made to the invention in light of the above description.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification. Accordingly, the actual scope of the invention encompasses not only the disclosed embodiments, but also all equivalent ways of practicing or implementing the invention.

The above description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. The elements and acts of the various embodiments described above can be combined to provide further embodiments.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

What is claimed is:

1. A kit comprising a plurality of devices for use with a reference tool comprising a first straight side and a second straight side, each of the devices comprising:
   a body having a width, a length, and a groove formed in the body along the length, the groove dimensioned to receive at least a portion of one of the straight sides, the body also having a base surface for engaging a metal workpiece surface, and the base surface further being configured so that when the at least a portion of the straight side is received within the groove the base surface is parallel to the straight side;
   a retention assembly mounted to the body, the retention assembly for co-operating with the reference tool, when provided, and disengagably securing the body to the reference tool and retain the at least a portion of one of the straight sides within the slot; and
   at least one magnet mounted to the base surface of the body for temporarily securing the base surface to the workpiece surface;
   wherein at least a portion of the first straight side is receivable within the groove of a first device of the plurality of devices, and at least a portion of the second straight side is receivable within the groove of a second device of the plurality of devices; and
   further comprising an attachment means for removably attaching the plurality of devices together.

2. The kit of claim 1, wherein the width of at least one of the plurality of devices is shorter than the length.

3. The kit of claim 2, wherein the body of at least one of the plurality of devices is the shape of a rectangular block.

4. The kit of claim 1, wherein the width of at least one of the plurality of devices is equal to the length.

5. The kit of claim 1, wherein the retention assembly of at least one of the plurality of devices comprises one or more threaded thumbscrews that extend through corresponding one or more threaded apertures formed on the body and into the groove so that, when tightened, the one or more thumbscrews urge the reference tool, when provided, tightly against the slot.

6. The kit of claim 1, wherein the base surface of at least one of the plurality of devices is flat.

7. The kit of claim 1, wherein the at least one permanent magnet of at least one of the plurality of devices comprises three permanent magnets.

8. The kit of claim 1, wherein the base surface of at least one of the plurality of devices forms a u-shaped groove.

9. The kit of claim 1, wherein the base surface forms of at least one of the plurality of devices a v-shaped groove.

10. The kit of claim 9, wherein the one or more permanent magnets includes one or more pairs of permanent magnets that are positioned to oppose each other on the v-shaped groove.

11. The kit of claim 1, wherein at least one of the plurality of devices further comprises an adjustable dial level mounted on the body.

12. The kit of claim 1, wherein at least one of the plurality of devices further comprises a channel formed through the body for securing the device to a second reference tool or workpiece in engagement with the base surface.

13. The kit of claim 1, wherein the plurality of devices have at least two different lengths.

14. The kit of claim 1, further comprising a carpenter's protractor comprising two arms compatible with the plurality of devices.

15. The kit of claim 1, further comprising a carpenter square compatible with the plurality of devices.

16. The kit of claim 1, wherein the base surface of the first device is engagable with a first workpiece and the base surface of the second device is engagable with a second workpiece, and wherein the first and second workpieces are aligned with respect to each other by the reference tool when at least a portion of the first and second straight sides are received within the grooves of the first and second devices, respectively, and the base surfaces of the first and second devices are engaged with the first and second workpieces, respectively.

17. The kit of claim 16, wherein a magnetic force exerted by the at least one magnets of the first and second devices holds the first and second workpieces properly aligned with respect to each other by the reference tool when at least a portion of the first and second straight sides are received within the grooves of the first and second devices, respectively, and base surfaces of the first and second devices are engaged with the first and second workpieces, respectively.

18. A method of holding a reference tool in a position adjacent to a metal workpiece, the reference tool comprising a first straight side and a second straight side, the steps of the method comprising:
   inserting at least a portion of the first straight side into a groove formed in a first body;
   adjusting a first retention assembly mounted on the first body to retain the at least a portion of the first straight side within the groove of the first body using the first retention assembly, whereby when the at least a portion of the first straight side is retained within the groove of the first body, the first straight side is parallel to a base surface formed on the first body, and the reference tool is attached to the first body;
   inserting at least a portion of the second straight side into a groove formed in a second body;
   adjusting a second retention assembly mounted on the second body to retain the at least a portion of the second straight side within the groove of the second body using the second retention assembly, whereby when the at least a portion of the second straight side is retained within the groove of the second body, the second straight side is parallel to a base surface formed on the second body, and the reference tool is attached to the second body; and
   temporarily securing the base surfaces of the first and second bodies to the workpiece using one or more magnets mounted on the base surfaces of the first and second bodies, each of the base surfaces being in a location on the workpiece whereby the reference tool is also held in the position.

19. A method of extending the distance of measurement of a first reference tool comprising a straight side, the steps of the method comprising:
   inserting at least a portion of the straight side into a first and a second groove, the first and second groove being formed in a first and second body, respectively;
   adjusting a first and a second retention assembly mounted on the first and second bodies, respectively, to retain the at least a portion of the straight side within the first and second grooves using the first and second retention assemblies, whereby when the at least a portion of the straight side is retained within the two grooves the straight side is parallel to both a first and a second base surface formed on the first and second body, respectively;

attaching a second reference tool, the second reference tool being longer than the first reference tool, to the first and second base surfaces whereby the second reference tool extends away from the first reference tool parallel to the straight side.

\* \* \* \* \*